United States Patent
Anjali et al.

(10) Patent No.: US 10,521,581 B1
(45) Date of Patent: Dec. 31, 2019

(54) WEB CLIENT AUTHENTICATION AND AUTHORIZATION

(71) Applicant: EMC IP Holding Company LLC, Hopkinton, MA (US)

(72) Inventors: Anjali Anjali, Kapurthala (IN); Duc The Dang, San Jose, CA (US); Naveen Rastogi, San Jose, CA (US); Srinivas Paranthanate, Sunnyvale, CA (US); Zhiying Lin, Shanghai (CN); Alan Davie, Fremont, CA (US); Mojgan Ghanbaran, Emerald Hills, CA (US); Yingjie Ma, Shanghai (CN); Jingwen Zhang, Warren, MI (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 189 days.

(21) Appl. No.: 15/650,138

(22) Filed: Jul. 14, 2017

(51) Int. Cl.
  *G06F 21/33* (2013.01)
  *H04L 29/06* (2006.01)
  *G06F 21/62* (2013.01)

(52) U.S. Cl.
  CPC .......... *G06F 21/33* (2013.01); *H04L 63/102* (2013.01); *G06F 21/6218* (2013.01); *H04L 63/0807* (2013.01); *H04L 63/10* (2013.01); *H04L 63/101* (2013.01)

(58) Field of Classification Search
  CPC ...... G06F 21/33; G06F 21/6218; G06F 21/62; H04L 63/102; H04L 63/0807; H04L 63/101; H04L 29/06; H04L 63/10
  See application file for complete search history.

(56) References Cited

U.S. PATENT DOCUMENTS

| | | | |
|---|---|---|---|
| 7,069,440 B2 * | 6/2006 | Aull | G06F 21/33 707/999.201 |
| 9,843,587 B2 * | 12/2017 | Meunier | G06F 21/57 |
| 2003/0237004 A1 * | 12/2003 | Okamura | H04L 63/0272 726/15 |
| 2009/0055642 A1 * | 2/2009 | Myers | H04L 63/0869 713/155 |
| 2009/0327696 A1 * | 12/2009 | Hatlelid | H04L 63/0823 713/151 |
| 2011/0126003 A1 * | 5/2011 | Engert | H04L 63/0823 713/156 |

* cited by examiner

Primary Examiner — Jayesh M Jhaveri
(74) Attorney, Agent, or Firm — Workman Nydegger (57) ABSTRACT

Systems, methods, and apparatus for authenticating and authorizing clients. A client certificate is used to authenticate and authorize a client (or user). When the client certificate is received, the certificate is authenticated. If the certificate is valid, a username included in the certificate is used to authorize the client. This may be done based on privileges or permissions associated with the user name. Once the client or user is authenticated and authorized, operations requested by the client can be performed as long as permitted by the privileges or permissions.

12 Claims, 3 Drawing Sheets

WEB CLIENT AUTHENTICATION AND AUTHORIZATION

FIELD OF THE INVENTION

Embodiments of the invention relate to authentication and/or authorization systems and methods. More particularly, embodiments of the invention relate to systems and methods for authenticating and authorizing clients and users in computing systems including data protection systems.

BACKGROUND

Generally, a web service is a program or software that makes itself available over a network (e.g., the Internet) or that communicates over the network. For example, data may be protected in the cloud (e.g., in a data center or on a dedicated device/server) using web services. These web services may allow a client to backup and restore data.

In order to use web services of a data protection system, a client may be asked to authenticate. Conventionally, authentication is performed by sending a username and password to the data protection system or, more specifically, to a server. If the authentication is successful, a valid authentication token is returned to the client from the server. The authentication token can then be used during subsequent communications.

Authentication using a username and password, however, has various problems. For example, the client may be required to re-authenticate by providing the username and password if the authentication token expires. The username and password could be compromised if not protected at the client. The authentication token also needs to be protected. In addition, if a user role is changed or has changed, this does not necessarily invalidate the authentication token, which may be associated with higher role privileges. This could lead to unauthorized access.

Systems and methods are needed to improve the authentication and authorization procedures associated with web services.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate generally to data protection systems. Data protection systems are configured to perform data protection operations that may include, but are not limited to, backup operations, restore operations, copy management or replication operations, deduplication operations, or the like or any combination thereof.

Embodiments of the invention more specifically relate to systems and methods for authenticating and/or authorizing clients (e.g., devices, machines, and/or users) that may perform data protection operations. Embodiments of the invention relate to authentication and authorization processes that incorporate a client certificate in addition to or in place of a username and password mechanism. Using a client certificate in the authentication and authorization processes allows access to and use of a data protection system to be made more secure.

For example, changes to a user's permissions or roles can be enforced or honored based on the client certificate. Requests that rely on username and password or on an outdated authentication token are more difficult to effectively manage compared to when a client certificate is used to authenticate and authorize a user or client. A client certificate mechanism thus provides a more secure way to access a data protection system and a more secure way to manage any access granted to a data protection system.

Generally, certificates provide a public/private key infrastructure using, for example, asymmetric cryptography, that allow a user to be authenticated. Certificates often rely on a trusted third party (e.g., a certificate authority) when using certificates. The certificate authority, in some embodiments of the invention, may be in-house and used specifically within the context of the data protection system. A certificate can be used to inform others, in a trusted manner, that a user is who he or she says. Embodiments of the invention expand on conventional certificates and allow a user to be both authenticated and authorized using a certificate. The authentication and authorization processes may be an "in-house" client certification verification process using, by way of example and not limitation, REST (Representational State Transfer) services and REST architecture. An "in-house" client certification system allows the data protection system to be the certificate authority and issue certificates to clients. In other words, the client certification system may be specific to the data protection system. In some embodiments, users or clients can import their CA certificates into the data protection system and use their client certificates as long as their client certificates contain their user identifier. The user identifier may be identified in a subject line. For example: subject: CN=anjala. The details of the certificate can then be examined using a command such as openssl x509 -in<client_certificate.cr> - noout - text. A conventional certificate authority could also be used, however. Embodiments of the invention may execute in the context of SSL (Secure Sockets Layer). For example, the normal SSL handshake and verification through HTTPS between client and server may occur before entering the authentication and authorization processes.

In addition to performing authentication using a certificate, a SMS (Systems Management Server) associated with the data protection system may also perform RBAC (role base access control) to authorize the user based on his or her role in the system. In one embodiment, the client certificate thus contains the user information (e.g., the user name or user ID), and this user information should be, by way of example, a valid local, NIS (Network Information Service) or AD (Active Directory) user on the server or in the data protection system. The access or privileges granted to the user may be determined using access controls (e.g., a mapping of username to privileges or permissions).

The SMS authenticates the client certificate using the client CA certificate, which is imported on the data protection system prior to the authentication process. With the client certificate authentication and authorization method, the client does not need to use his or her username and password to obtain an authentication token. Rather, the communications may be certificate based.

Embodiments of the invention may also provide backward compatibility with the current user name and password authentication and authorization processes. If the client specifies an authentication token in the HTTP header, then the REST framework handler may use the authentication token to authenticate and authorize the client. Otherwise, the REST framework handler will execute the client certification verification process.

Figure 1:
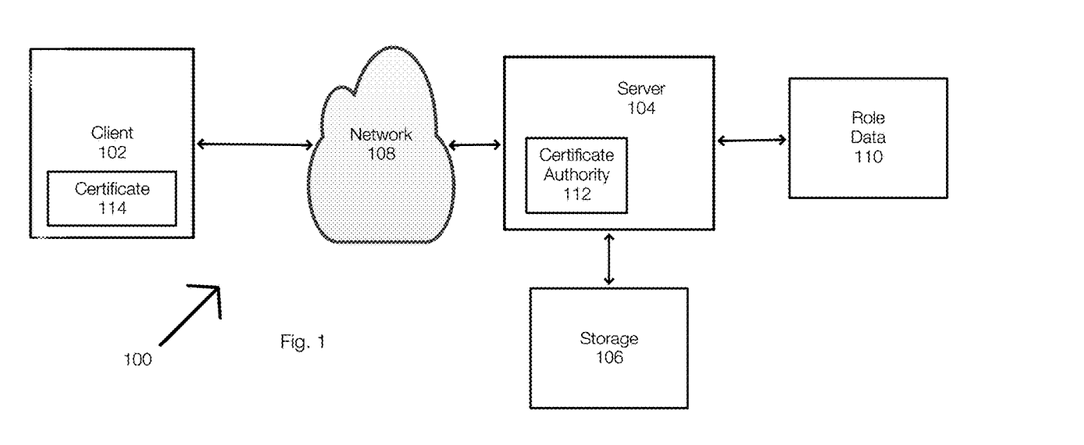
FIG. 1 illustrates an example of a computing system that includes a data protection accessible over a network.

FIG. 1 illustrates an example of a computing system 100 which includes an example of a data protection system. The data protection system may be accessed on a web call basis or using servers. The web services may enable or provide access to data protection operations such as backing up data, restoring data, copy management, deduplication, or the like or combination thereof. Embodiments of the invention relate to systems and methods for authenticating and authorizing clients (or users) in a computing system such as the computing system 100.

The system 100 is represented as including a client 102 and a server 104 (e.g., a systems management server). Of course, the data protection system may include multiple servers and some of the servers may have different responsibilities. In addition, multiple clients may be able to communicate with the server or servers of the data protection system.

When using certificate based authentication, it may be necessary to prepare the client 102 and to prepare the server 104 prior to operation. With respect to the client 102, a CA certificate may be generated and saved. Next, a client certificate (e.g., the certificate 114) may be generated and saved. If the client 102 has already obtained the client certificate and the CA certificate from another source, these initial steps may not be necessary. In some examples, existing certificates may be imported.

Next, the CA certificate is imported and the CA certificate is copied or imported to the client 102. This may help avoid errors related to an unknown CA certificate in one embodiment. Next, the client certificate may be imported into a browser.

On the server 104 side, the server 104 may ensure that the client CA certificate is properly installed and that the username is valid on the data protection system.

In FIG. 1, the client 102 communicates with a server 104 over a network 108 such as the Internet. The network 108 may include multiple networks (wired and/or wireless) such as local area networks, cellular networks, wide area networks, or the like or combination thereof. The client 102 may be a computing device such as a computer, laptop, tablet device, mobile phone, or the like. The client 102 is typically associated with a user.

The server 104 may be associated with storage 106, which may be used to store and manage data associated with the client 102. The server 104 may store or manage data for multiple clients. The clients may be associated with the same entity or with different entities. Typically, the data associated with different entities is maintained separately. In fact, each entity may be associated with a different data protection system or a different instance of a data protection system. The server 104 may also maintain role data 110. The role data 110, by way of example, may map usernames or user IDs to privileges or access permissions. The role data 110 effectively defines the roles of valid users.

FIG. 1 illustrates that the server 104 includes, in one example, a local certificate authority 112. The certificate management server 112 may be associated with the server 104 or may be independent of the server 104.

The client 102 may be authenticated using a client certificate, such as the certificate 114. The certificates that may be involved in authentication may be generated and installed previously. When the client 102 (or user) authenticates (e.g., in the context of a request to access the data protection system or data managed by the data protection system), the certificate 114 is sent to the server 104. When the certificate 114 is received by the server 104, the server 104 may determine whether the certificate 114 is valid. For example, if the certificate 114 was signed by the certificate authority 112, then the CA certificate can be used to determine that the certificate 114 is valid. If valid, the client 102 or the user is effectively authenticated. More specifically, if the certificate of the client is valid, the username can be extracted from the certificate.

Once the client 102 is authenticated, the user or client can then be authorized. Stated differently, the authorizations of the user can then be determined. This is achieved, in part, by extracting the username from the client certificate 114 and then ascertaining the role or privileges of the user. The server 104 may maintain information, such a role data 110, that effectively maps the usernames associated with the server 104 (or that are valid in the data protection system) or with clients of the server 104 to roles (e.g., permissions, privileges, etc.). Thus, the username included in the certificate 114 can be mapped to the role data 110 to determine the valid roles of the user. The roles may determine, by way of example, how the user may interact with or use the data maintained in a storage 106. The roles may determine how the user can use or access the data protection system. The role may allow the user to read, write, delete, copy, move, restore, or the like or any combination thereof. The roles can be defined in various ways. The roles may grant/deny a class of privileges, specific privileges, or the like.

Using a certificate for both authentication and authorization in this manner ensures that the server 104 or data protection system is not relying on an outdated authentication token. For example, if the permissions of a particular user change, then the new permissions will be honored based on the certificate. Further, the server 104 may also maintain and control certificate policies using, by way of example, a certificate revocation list. Thus, the ability of a specific user to access data can be managed by simply changing the policy or the user's role. This prevents a user whose role has changed from accessing data using an authorization token that is outdated and associated with different privileges.

When the client 102 initiates a communication with the server 104, the certificate 114 may be included in the request or as a prelude to the communication. In this example, the certificate 114 may include information about the body (e.g., the certificate authority 112) that signed the certificate 115, a version, a validity period, a signature (e.g., generated using a private key of the CA authority), a signature algorithm, and public key information of the client, which may include the public key.

In one example, the certificate 114 may also include a username or a user ID of the user that is attempting to access the server 104. As previously indicated, the username may be used to authorize the client 102 or the user of the client 102.

Figure 2:
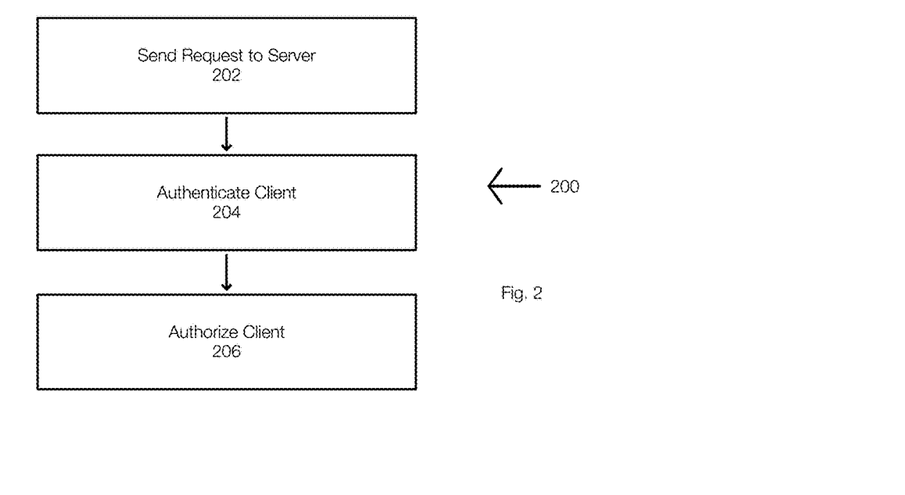
FIG. 2 illustrates an example of a method for authenticating and authorizing a client with a data protection system.

FIG. 2 illustrates an example of a method for client (or user) authentication and authorization. The method 200 may begin when a request is sent 202 to a server or to a data protection system. During this process, the client certificate is ultimately send to the server such that the server can validate the client certificate. Thus, the client is authenticated 204 based on the client's certificate. When sending the request to the server, a handshake protocol may be conducted (e.g., a SSL handshake). This allows the client 102 to send the certificate 114 to the server 104. After the handshake is completed, the request generated by the client 102 may also include an operation to be performed by the server 104.

After the client is authenticated by the server 104 based on the client certificate 114, the client is then authorized 206. During authorization, a username included in the client certificate is reviewed to determine the access or privileges of the associated user. The operation included in the request may then be granted or denied accordingly.

Figure 3:
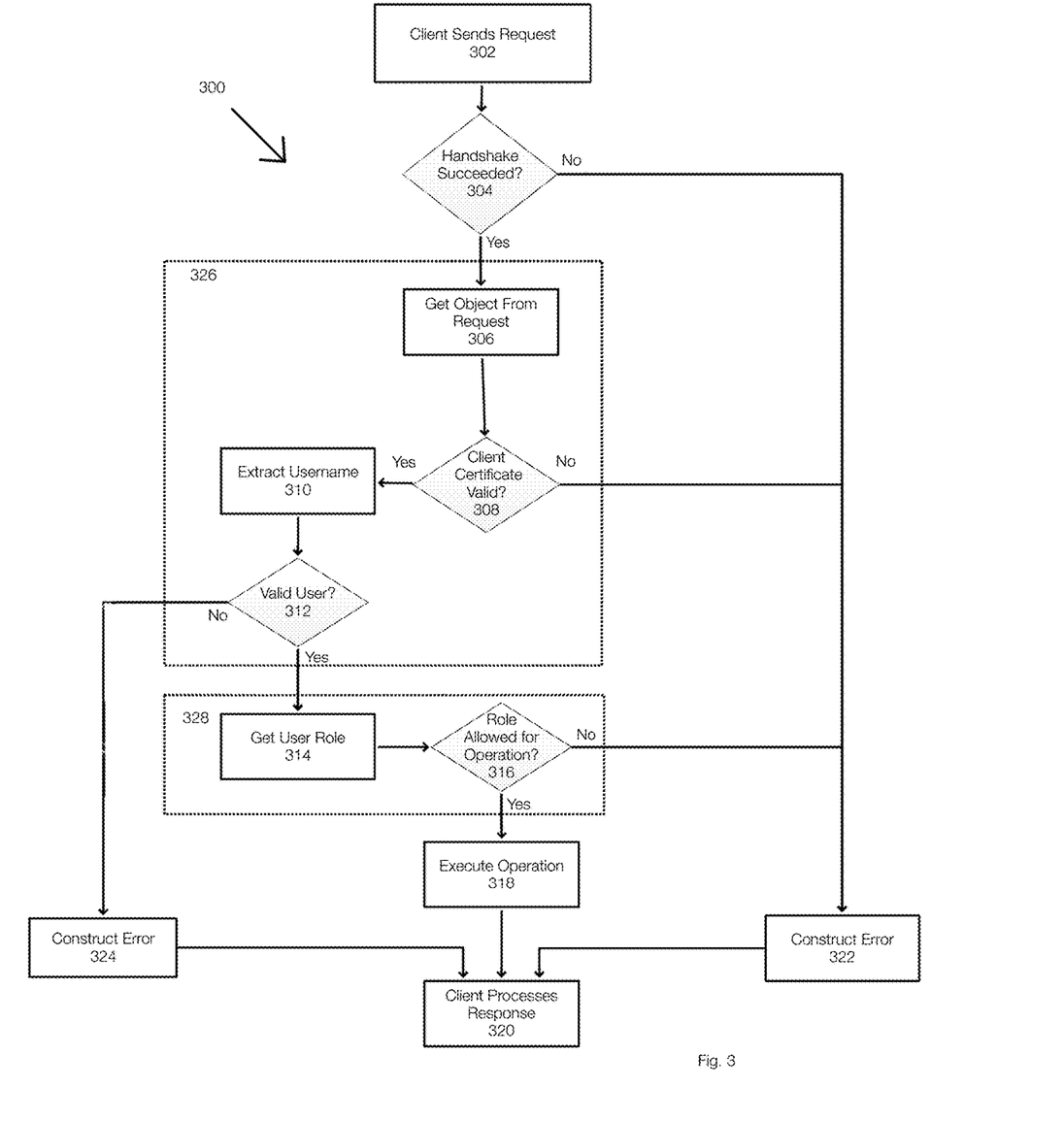
FIG. 3 illustrates a more detailed method for authenticating and authorizing a client with a data protection system.

FIG. 3 is a flow diagram illustrating an example of a method for authenticating and authorizing a client. The method 300 may begin when a client sends 302 a request to a server. The request is typically associated with a handshake. In SSL, by way of example, the handshake allows the server to provide the client with a server certificate. The client, if desired and if necessary, can validate the server certificate. In another example, the client may already have a copy of the server certificate. If the handshake is not successful, an error is constructed 322 and provided to the client.

If the handshake is successful 304, the server may then begin client authentication in box 326. Initially, the server obtains 306 an object from the request. More specifically, the server may obtain an SSL object from the HTTPs request from the client. The object may include the client certificate. The server then determines 308 if the client certificate is valid. If the client certificate is not valid, an error in constructed 322.

If the client certificate is valid, the server may extract 310 the username or other user identifier from the client certificate. If the user is not valid, an error is constructed 324 and provided to the client. If the username or user is valid in 312, then the server may perform authorization in box 328.

In authorization, the user role is obtained 314 based on the username extracted from the client certificate. The server may then determine 316 whether the role identified in 314 is permitted. In other words, the server may determine whether the user is permitted to perform the requested operation. This is determined by the user's role, privileges, or permissions. If the operation is not permitted based on the user's role, an error is constructed 322. If the user is allowed to perform the operation, the operation is executed 318 and a client response is processed 320. The response may include the result of the operation or an indication that the operation has been completed or initiated or the like.

Figure 4:
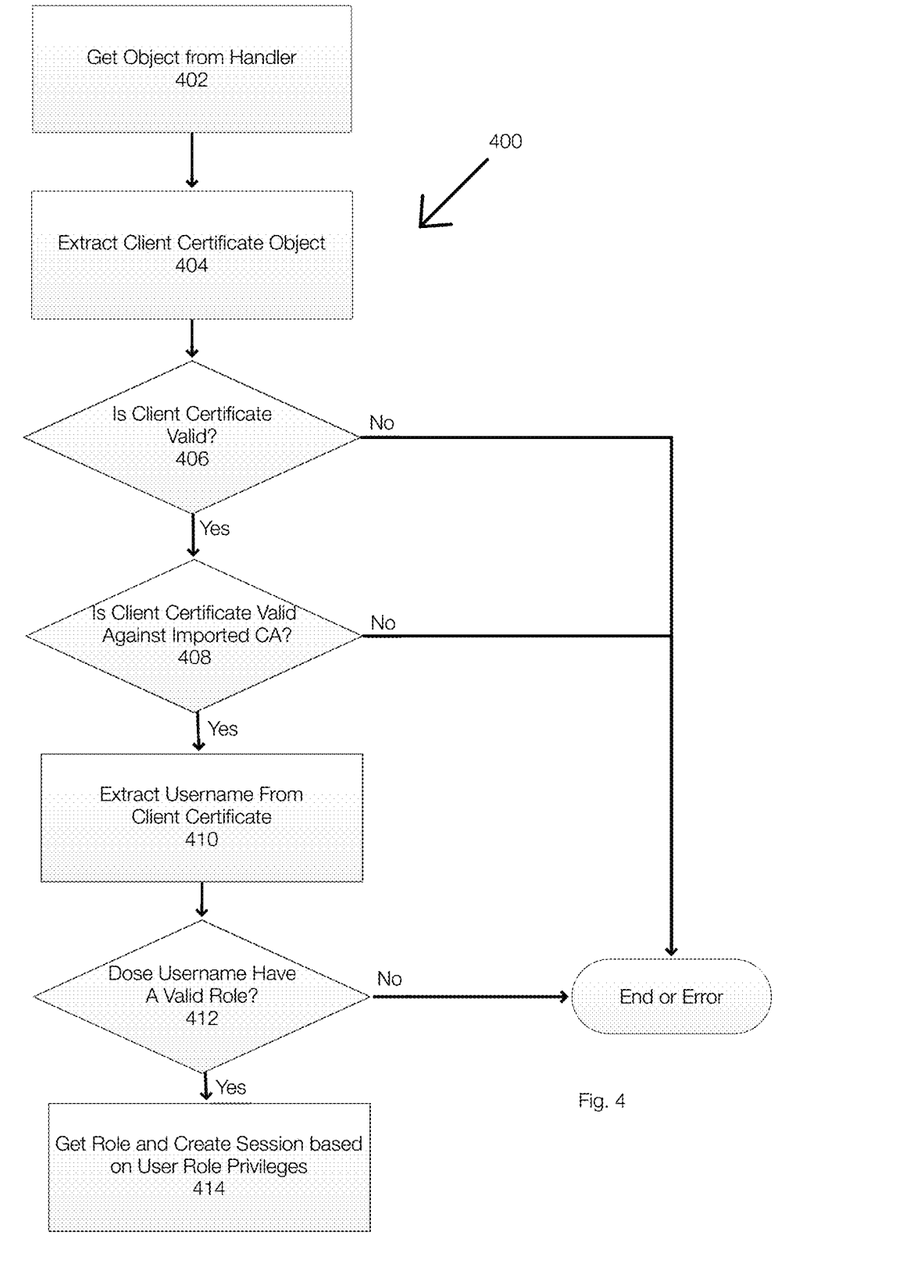
FIG. 4 illustrates and example for authenticating a client and authorizing the client.

FIG. 4 illustrates an example of a method for authenticating a client. In the method 400, an object is obtained 402 from a handler. More specifically, in one embodiment, an SSL object is obtained from an HTTPS handler. This may be part of the request received from the client. Next, the client certificate object is extracted 404.

After extracting the certificate, the server determines if the client certificate is valid 406. If not, the process ends and an error may be reported to the client. If the client certificate is valid, the validity of the client certificate is determine against the imported CA 408. If the client certificate is not valid, the process ends and an error may be reported.

If the client certificate is valid against the CA, then the username is extracted from the client certificate 410. The method 400 then determines whether the username is valid at 412. If not, then the process ends and an error may be reported.

If the username is valid at 412, the role of the user is obtained. The operation requested by the client is performed only if allowed by the role.

Thus, a user can be authenticated and authorized using certificate based authorization and authentication.

With continued reference to FIG. 1, the server 104 may maintain a certificate revocation list. This list may be maintained by the certificate authority 112 and is maintained on the data protection system itself (e.g., on the systems management server). In one embodiment, the data protection system can added certificates that have been revoked to the certificate revocation list. Access can be controlled more effectively and there is no need to be concerned with authentication tokens and no need to protect the authentication tokens.

Embodiments of the invention provide features including, for example, a client certificate that is used to authenticate and authorize a user in addition to or in place of or in conjunction with a username and password mechanism. With a client certificate, if user permission changes, then subsequent request for authentication and authorization with the client certificate will honor the user permissions and will not rely on an outdated authentication token.

A client certificate mechanism provides a strong public key infrastructure, which uses asymmetric cryptography. As a result, embodiments of the invention provide a more secure way to access a computing system such as a data protection systems. The client certificate authentication and authorization may be provided on a per web service call basis.

A client certificate mechanism provides better authentication control options to users, Users can control the certificate policies via certificate revocation list.

Aspects of the invention may also be visible. For example, the trust store and certification revocation list can be updated on the data protection system. Further, a proper authentication and authorization error message will be returned to the client if the client certificate is invalid, revoked or expired or if the client is not authorized for a requested operation.

In one embodiment, the authentication and authorization process is an in-house client certification verification that uses, by way of example only REST services. This process may be executed on top of the SSL layer. Therefore, the normal SSL handshake and verification through HTTPS between client and server may be required to pass before entering this authentication and authorization process.

Besides authenticating a client, an SMS server may also perform RBAC (role base access control) to authorize the user based on his or her role on the system. Therefore, the client certificate contains the user information (user name), and this user must be a valid local, NIS or AD user on the server side. SMS validates and authenticates the client certificate using the client CA certificate, which is imported on the data protection system prior to the authentication process.

With the client certificate authentication and authorization method, the client does not need to use a username and a password to get an authentication token.

In one embodiment, this process reserves the backward compatibility with the current user name and password authentication and authorization. If a client specifies the authentication token in the HTTP header, then the REST framework handler will use the authentication token to authenticate and authorize the client. Otherwise, the REST framework handler will execute the client certification verification process.

On the SMS server, each HTTPS connection associates with an SSL context object. After successful connecting, the SSL context object contains the complete client secured information including client certificate if it is specified. The SMS will execute the client certificate authentication and authorization process if there is no authentication token specified in the HTTP headers.

In case of success, the SMS server may return the result response HTTP message to the client. Also, the SMS may return a valid authentication token. The client can use this authentication for subsequent requests or continue to use client certification verification method.

On the other hand, in case of failure, the response will contain the error with corresponding HTTP status code in one embodiment.

The client is authenticated and authorized based on the username in the client certificate. This functions when the client CA certificate on the data protection system is properly imported and when the username, specified in the client certificate, is a valid local or name service user on the data protection system.

The client and/or server and/or data protection system can be prepared for operation. The following example is by way of illustration only and not limitation.

Preparation on the client side.

1.a. Copy these two attached files, generate_certs.sh and setup.conf, from the following bugzilla to the local system, where the web requests will be sent.
https://bugzilla.datadomain.com/bugzilla/show bug.cgi?id=149765

1.b. Generate the CA certificate
./generate_certs.sh ca
CA certificate is generated and saved in directory ./EMC_CA 1.c. Generate the client certificate with a valid local or name service (NIS, AD) user name on the data protection system
Generate client certificate for user "anj" and save in certificate file "anj_client".*
./generate_certs.sh client "anjala" anj_client Here is the detail of this client certificate, where the subject contains the user identity for the data protection system, CN=anjala. In this example, the certificate is examined using openssl. The certificate includes the username anjala. As a result, if the certificate is valid, the user is authenticated. Then, if the username is associated with a valid role and the session may be associated with the role of the user.

ddang@dangd1-dl:/wspace/cert_gen_scripts/demoCA/certs$
openssl x509 -in
anjala_client.cer -noout -text
Certificate:
 Data:
  Version: 3 (0x2)
  Serial Number: 1 (0x1)
 Signature Algorithm: sha1WithRSAEncryption
  Issuer: CN=RSA Key Manager Appliance Demo Root CA - 2016-02-22 15:37:27
  Validity
   Not Before: Feb 22 23:38:16 2016 GMT
   Not After : Feb 21 23:38:16 2017 GMT
  Subject: CN=anjala
  Subject Public Key Info:

Public Key Algorithm: rsaEncryption
    Public-Key: (2048 bit)
    Modulus:
     00:cf:80:31:b1:cd:10:a2:4d:6e:5e:d6:1a:d4:d0:
     95:fd:f4:98:60:d4:97:f6:bc:c8:37:33:2c:8a:a0:
     ae:4a:bc:17:2c:71:8f:ab:eb:87:12:14:4d:a1:d4:
     e7:4c:10:80:a9:a5:d7:73:8c:11:74:18:c1:6a:0f:
     34:af:8f:63:e4:d5:19:af:7e:7b:13:13:1e:45:de:
     46:5a :3f:20:ab:f9:7e:89:11:57:29:45:11:05:36:
     23:86:6a:ae:df:7d:06:7b:49:b4:c0:1a:07:fe:54:
     ac:1c:8b:12:f4:31:e1:66:d2:55:c4:5f:b3:6c:af:
     7d:16:02:71:8f:10:b1:82:94:e1:1f:15:94:38:5d:
     e8:4e:03:d5:92:a7:11:f1:8e:32:10:71:5d:09:b0:
     7a:e1:7d:16:8b:ac:94:e0:5b:93:ca:72:37:90:3d:
     aa:e3:94:1d:8f:f8:cb:71:3f:e4:a4:17:b6:7f:11:
     90:cd:2a:d1:90:bb:f2:96:c5:ea:16:84:dd:ef:3b:
     45:cb:bd:46:a9:76:7e:46:4e:d5:74:b8:7d:4f:f4:
     36:a8:78:85:ae:83:7a:8e:96:a7:ef:0a:57:7e:5c:
     7d:b4:d3:b5:5b:75:18:3d:be:cd:26:08:00:c9:03:
     d5:12:49:f1:48:35:63:4b:5a:54:f6:98:86:e4:a5:
     1e :63
    Exponent: 65537 (0x10001)
  X509v3 extensions:
   X509v3 Basic Constraints:
    CA:FALSE
   Netscape Cert Type:
    SSL Client
   X509v3 Key Usage:
    Digital Signature, Non Repudiation, Key Encipherment
   X509v3 Extended Key Usage:
    TLS Web Client Authentication
   X509v3 Subject Key Identifier:
    2F:FB:77:B3:9A:B6:2E:BB:42:FC:55:3D:43:DD:82:BC:20:2F:73:D2
   X509v3 Subject Alternative Name:
    DNS:kb.example.com, DNS:helpdesk.example.org, DNS:systems.example.net, IP Address:192.168.1.1, IP Address:192.168.69.14
  Signature Algorithm: sha1WithRSAEncryption
   44:3e:bd:95:c7:0e:53:72:e6:2a:3c:a4:98:ad:9d:1e:46:46:
   de:e5:46:57:30:55:00:d4:7d:2c:48:fc:91:05:67:6e:e6:de:
   0b:83:43:14:57:b7:bd:98:71:ed:51:91:cb:07:30:fd:3a:c9:
   3d:3e:e5:52:67:5c:d3:aa:90:b4:17:41:14:48:bb:9e:60:df:
   90:73:dc:ed:f1:eb:d9:fd:86:21:ce:d0:ec:fe:1a:4d:86:ee:
   22:65:47:57:05:c9:fd:e7:dd:39:ed:80:b1:05:00:75:98:4c:
   d5:74:43:3d:fa:6a:00:63:2a:2d:d0:8c:2f:8e:e2:30:ec:ae:
   0b:40:c7:8f:d9:75:3d:95:e1:40:5c:24:3d:32:0c:b2:5d:d0:
   46:0d:89:4c:9a:de:50:95:bd:af:d0:8a:05:de:26:53:01:5b:
   47:fc:fb:d9:07:c9:71:b7:b2:b3:d3:21:94:f1:09:e6:c0:15:
   ea:66:87:67:d9:82:07:49:bb:86:b8:91:b1:c5:b2:fc:57:5d:
   fb:54:7e:83:fd:0c:10:bc:4e:9a:a5:9d:10:a0:a1:b4:af:63:
   b7:82:9c:c5:63:3b:89:d7:57:0b:d6:58:90:72:0d:ca:1a:89:
   07:14:fe:d4:f6:e8:06:06:90:4f:e3:33:6e:eb:e3:09:92:17:
   68:94:f7:bf Client certificate files are saved in ./EMC_CA/certs If the client has already obtained the client and CA certificates from another source, then step 1.a, 1.b and 1.c are not needed.

1.d. Import the CA certificate on data protection system
ssh sysadmin@<DD hostname/IP> adminaccess \ certificate import ca application \ login-auth <cacert.pem 1.e. Copy data protection system CA certificate to the client system
If it is needed, the data protection system CA certificate can be copied and saved on the local system so that the server communication can be verified.

Openssl can be used to get the public CA of data protection system.
openssl s_client -showcerts -connect <DD hostname/IP>:3009 \ < /dev/null A sample output is presented below, in which the last server certificate is the CA certificate. Copy this CA certificate from "BEGIN CERTIFICATE" to "END CERTIFICATE" and save this certificate to use as needed.
dangd1$ openssl s_client -showcerts -connect 10.25.183.157:3009

</dev/nullCONNECTED(00000003)
depth=1/C=US/ST=CA/L=Santa Clara/O=Valued Datadomain Customer/OU=Root CA/CN=ddve-25183157.brs.lab.emc.com
verify error:num=19:self signed certificate in certificate chain
verify return:0
---
Certificate chain
0 s:/C=US/ST=CA/OU=Host Certificate/O=Valued Data-Domain customer/CN=ddve-25183157.brs.lab.emc.com
i:/C=US/ST=CA/L=Santa Clara/O=Valued Datadomain Customer/OU=Root CA/CN=ddve-25183157.brs.lab.emc.com
BEGIN CERTIFICATE ------
MIICgjCCAesCAQIwDQYJKoZIhvcNAQEFBQAwgY8x
CzAJBgNVBAYTAIVTMQswCQYD
VQQIDAJDQTEUMBIGA1UEBwwLU2FudGEgQ2xhcm
ExIzAhBgNVBAoMGIZhbHVIZCBE
YXRhZG9tYWluIEN1c3RvbWVyMRAwDgYDVQQLD
AdSb290IENBMSYwJAYDVQQDDB1k
ZHZILTI1MTgzMTU3LmJycy5sYWIuZW1jLmNvbTAe
Fw0xNDEyMTcxNzAwMDhaFw00
NTEyMTAwMTAwMDhaMIGCMQswCQYDVQQGEw
JVUzELMAkGA1UECAwCQ0ExGTAXBgNV
BAsMEEhvc3QgQ2VydGlmaWNhdGUxIzAhBgNVBAo
MGIZhbHVIZCBEYXRhRG9tYWIu
IGN1c3RvbWVyMSYwJAYDVQQDDB1kZHZILTI1MT
gzMTU3LmJycy5sYWIuZW1jLmNv
bTCBnzANBgkqhkiG9w0BAQEFAAOBjQAwgYkCg
YEApjSI3E0R2gGy0pxsvdHkQLEE
fKuup2bE3HT8t2QokJYAadw/jb4BaHZ3sKkR+
nr5ZKj4QfHea15U6+uDaGF6iT/1
5g6pPj+Jh4Cnyn9iIjFJNPvQJXsk5A//
JLh5Fr6IIQVizqJ9vOr88QvJsDPqVeJ4
ndE92XdxXOMDwMFPvIECAwEAATANBgkqhkiG9w
0BAQUFAAOBgQAOY2DRbw9xBD/M
irnP4L8+T1dtk9i6ZMPP9rehIqzxo0TRhy/XfaX/
wIhPNnymwAGT0m9U1Oib6AVk
/RuZM0WNnGzarRIk0KYStD84MOfGsPRbPNkPfk/
tBNxxkCnMjdawdv9xyt6FIqin
/N0FUcNkL1qm5Y8JwSajx6AiIXGt4w==
END CERTIFICATE ------
1 s:/C=US/ST=CA/L=Santa Clara/O=Valued Datadomain Customer/OU=Root CA/CN=ddve-25183157.brs.lab.emc-.com
   i:C=US/ST=CA/L=Santa Clara/O=Valued Datadomain Customer/OU=Root CA/CN=ddve-25183157.brs-.lab.emc.com
BEGIN CERTIFICATE ------
MIICIDCCAf2gAwIBAgIBADANBgkqhkiG9w0BAQUF
ADCBjzELMAkGA1UEBhMCVVMx
CzAJBgNVBAgMAkNBMRQwEgYDVQQHDAtTYW50
YSBDbGFyYTEjMCEGA1UECgwaVmFs
dWVkIERhdGFkb21haW4gQ3VzdG9tZXIxEDAOBgNV
BAsMB1Jvb3QgQ0ExJjAkBgNV
BAMMHWRkdmUtMjUxODMxNTcuYnJzLmxhYi5IbW
MuY29tMB4XDTE0MTIxODAxMDAw
OFoXDTQ1MTIxMDAxMDAwOFowgY8xCzAJBgNVB
AYTAIVTMQswCQYDVQQIDAJDQTEU
MBIGA1UEBwwLU2FudGEgQ2xhcmExIzAhBgNVBAo
MGIZhbHVIZCBEYXRhRG9tYWIu
IEN1c3RvbWVyMRAwDgYDVQQLDAdSb290IENBM
SYwJAYDVQQDDB1kZHZILTI1MTgz
MTU3LmJycy5sYWIuZW1jLmNvbTCBnzANBgkqhki
G9w0BAQEFAAOBjQAwgYkCgYEA
wKoti2sp12Yj3H3PfUui3Mxv3H64M8N4B8RPAgg3ae
AK/EcdnK1SnqtIfoyAytc0
MG6uqVKYOA/
GATp4TaxFATRnrIfdbbOk41eHvgkyaSO1IYMU0APpdGz
QX+4sSbtH
aEJhseEEDa3F35qACk3TSzLYTJAbn+
6D1RhgP6R5jn8CAwEAATANBgkqhkiG9w0B
AQUFAAOBgQCihdO8qfAThy1/
0R3btmNYrNkhHobUA41bNr+Ca7aGVgNomO+sugcs
t8B5fN+UKFFTEjz4e4vOkA7RbIVG2+6MxJj-
mZEaWjgvBkpMWrikqxwAnJZPqX/WX
etec6IhTRjgoCURwK+
OMyJypRrx7uOIxOiSgSrjjDLgVv2ZJ1+IO0Q==
END CERTIFICATE ------
---
Server certificate
subject=/C=US/ST=CA/OU=Host Certificate/O=Valued DataDomain customer/CN=ddve-25183157.brs.lab.emc.com
issuer=/C=US/ST=CA/L=Santa Clara/O=Valued Datadomain Customer/OU=Root CA/CN=ddve-25183157.brs.lab.emc.com On a LINUX or UNIX system, to save the data protection system certificate to the file, "vi" or "echo" commands can be used. For system wide use, OpenSSL keeps the trusted CA certificates in/etc/ssl/certs.

The command "vi" to open a file then cut and parse the data protection system CA certificate then save the file. The "echo" command to save is as follows.

echo "-------- BEGIN CERTIFICATE -----
MIICIDCCAf2gAwIBAgIBADANBgkohkiG9w0BAQUF
ADCBjzELMAkGA1UEBhMCVVMx
CzAJBgNVBAgMAkNBMRQwEgYDVQQHDAtTYW5
0YSBDbGFyYTEjMCEGA1UECgwaVmFs
dWVkIERhdGFkb21haW4gQ3VzdG9tZXIxEDAOBgNV
BAsMB1Jvb3QgQ0ExJjAkBgNV
BAMMHWRkdmUtMjUxODMxNTcuYnJzLmxhYi5IbW
MuY29tMB4XDTE0MTIxODAxMDAw
OFoXDTQ1MTIxMDAxMDAwOFowgY8xCzAJBgNVB
AYTAIVTMQswCQYDVQQIDAJDQTEU
MBIGA1UEBwwLU2FudGEgQ2xhcmExIzAhBgNVBAo
MGIZhbHVIZCBEYXRhRG9tYWIu
IEN1c3RvbWVyMRAwDgYDVQQLDAdSb290IENBM
SYwJAYDVQQDDB1kZHZILTI1MTgz
MTU3LmJycy5sYWIuZW1jLmNvbTCBnzANBgkqhki
G9w0BAQEFAAOBjQAwgYkCgYEA
wKoti2sp12Yj3H3PfUui3Mxv3H64M8N4B8RPAgg3aeA
K/EcdnK1SnqtIfoyAytc0
MG6uqVKY0A/
GATp4TaxFATRnrIfdbbOk41eHvgkyaSO1IYMU0APpd
GzQX+4sSbtH
aEJhseEEDa3F35qACk3TSzLYTJAbn+
6D1RhgP6R5jn8CAwEAATANBgkqhkiG9w0B
AQUFAAOBgQCihdO8qfAThy1/
0R3btmNYrNkhHobUA41bNr+Ca7aGVgNomO+sugcs
t8B5fN+UKFFTEjz4e4vOkA7RbIVG2+6MxJj-
mZEaWjgvBkpMWrikqxwAnJZPqX/WX
etec6IhTRjgoCURwK+
OMyJypRrx7uOIxOiSgSrjjDLgVv2ZJ1+IO0Q==
---- END CERTIFICATE ------------------------">/etc/ssl/
certs/<dd hostname>.pem Preparation on the client side may then include importing the client certificates into or on browsers.

To use client certificate from a browser, the client certificate needs to be imported to the browser so that the browser can display the client certificate for choosing before sending the request to the data protection system. The client may need to provide the proof of possession to the browser by providing both private and public keys. The browser will validate the client using private and public keys but only send the client public key to the data protection system.

The server of the data protection system or on the data protection side (e.g., an SMS) can be prepared as follows. First, verify that the client CA is installed properly on the data protection system. Second, ensure that the username is valid on the data protection system. If the user is an NIS user, the system can be further prepared by identifying group information for the user, provide RBAC role for the user NIS group, and ensure that the NIS server and domain information is set if no default value is available.

The following pseudo code illustrates a test using CURL.

```
# curl --tlsv1 --cacert <path-to-dd-ca-cert>/<dd-cacert> \ -v
"https://<DDhostname>:3009/rest/v1.0/system" \ --request GET --header
"Content-Type: application/json"\
--cert <path-to-client-cert>/<client-public-cert> \ --key <path-to-client-cert>/<client-private-key>
Use -k option if the data domain system public CA certificate is not specified
# curl --tlsy1 -k \
-v "https://<DD hostname>:3009/rest/v1.0/system" \ --request GET
--header "Content-Type: application/json" \
--cert <path-to-client-cert>/<client-public-cert> \ --key <path-to-client-cert>/<client-private-key>
```

In one example, and for security purposes, the peer name should be the same with the subject name in the data protection system host certificate. The data protection system hostname should be resolvable. Here is an example:
ddang@dangd1-dl: curl --tlsv1 --cacert /etc/ssl/certs/ddr_ca-cert.pem -v "https://ddve-25183157.brs.lab.emc.com:3009/rest/v1.0/system" --request GET --header "Content-Type: application/json" --cert ./EMC_CA/certs/anj_client.cer --key ./EMC_CA/certs/anj_client.key *
About to connect( ) to ddve-25183157.brs.lab.emc.com port 3009 (#0)
* Trying 10.25.183.157 . . . connected
* successfully set certificate verify locations: * CAfile: ./trustedCA/cacert.pem
CApath: /etc/ssl/certs
* SSLv3, TLS handshake, Client hello (1):
* SSLv3, TLS handshake, Server hello (2):
* SSLv3, TLS handshake, CERT (11):
* SSLv3, TLS handshake, Request CERT (13):
* SSLv3, TLS handshake, Server finished (14):
* SSLv3, TLS handshake, CERT (11):
* SSLv3, TLS handshake, Client key exchange (16):
* SSLv3, TLS handshake, CERT verify (15):
* SSLv3, TLS change cipher, Client hello (1):
* SSLv3, TLS handshake, Finished (20):
* SSLv3, TLS change cipher, Client hello (1):
* SSLv3, TLS handshake, Finished (20):
* SSL connection using AES256-SHA
* Server certificate:
* subject: C=US; ST=CA; OU=Host Certificate; O=Valued DataDomain
customer; CN=ddve-25183157.brs.lab.emc.com
* start date: 2014-12-17 17:00:08 GMT
* expire date: 2045-12-10 01:00:08 GMT
* common name: ddve-25183157.brs.lab.emc.com (matched)
* issuer: C=US; ST=CA; L=Santa Clara; O=Valued Data-domain Customer;
OU=Root CA; CN=ddve-25183157.brs.lab.emc.com
* SSL certificate verify ok.
> GET/rest/v1.0/system HTTP/1.1
> User-Agent: curl/7.22.0 (x86_64-pc-linux-gnu) libcurl/7.22.0 OpenSSL/1.0.1 zlib/1.2.3.4 libidn/1.23 librtmp/2.3
> Host: ddve-25183157.brs.lab.emc.com:3009
> Accept: */*
> Content-Type: application/json
>
<HTTP/1.1 200 OK
<Content-Type: application/json
<Content-Length: 401
<X-DD-AUTH-TOKEN:
3638545ebfb8770f1fe975e2a915accd2
<X-DD-UUID: 8bc604f1233c1073:d175e3d721fe50c3
<Cache-Control: no-cache
<Server: Data Domain OS 0.6000.0.0-521337
<
* Connection #0 to host ddve-25183157.brs.lab.emc.com left intact
* Closing connection #0
* SSLv3, TLS alert, Client hello (1):
{"name": "ddve-25183157.brs.lab.emc.com", "version": "Data Domain OS 0.6000.0.0-521337", "serialno": "AUDVBDSS1DAVVU", "uptime": "14:36:59 up 8 days, 22:40", "uptime_secs": 772849, "uuid": "8bc604f1233c1073:d175e3d721fe50c3", "link": [{"rel": "self", "href": "/rest/v1.0/system" }, {"rel": "related", "href": "/rest/v1.0/dd-systems/8bc604f1233c1073%3Ad 175e3d721fe50c3/stats/compression/measurement s"}]}

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing access to a data protection system, the method comprising:
   receiving a request from a client, wherein the request includes an operation;
   performing a handshake operation to establish a session with a server included in the data protection system;
   obtaining a client certificate included in the request and determining whether the client certificate is valid;
   extracting a username of a user of the data protection system included in the client certificate when the client certificate is valid;
   determining whether the username is valid on the data protection system;
   obtaining a user role associated with the username when the username is valid on the data protection system, wherein the user role is associated with privileges and permissions that the user is granted, wherein the privileges and the permissions determine how the client uses the data protection system;
   authorizing the client to perform operations in accordance with the privileges and the permissions; and
   executing the operation when the operation is allowed based on the privileges and the permissions associated with the user role.

2. The method of claim 1, further comprising obtaining the client certificate from an object associated with the request.

3. The method of claim 1, further comprising, authenticating the client based on the client certificate and a CA certificate.

4. The method of claim 1, further comprising constructing an error message if the client certificate is not valid or if the client is not valid or if the username is not valid on the data protection system.

5. The method of claim 1, further comprising obtaining the role based on the username, wherein the username is associated with the role and wherein the role defines the privileges or the permissions of the client.

6. The method of claim 1, further comprising controlling certificate policies using a certificate revocation list.

7. The method of claim 1, further comprising sending a response about a completion of the operation to the client.

8. The method of claim 1, further comprising updating the user role of the client such that the updated user role is enforced during each subsequent session.

9. The method of claim 1, further comprising revoking the client certificate such that the client is neither authenticated nor authorized in the data protection system.

10. The method of claim 1, further comprising determining whether the client certificate is valid against a CA certificate stored at the server.

11. The method of claim 10, further comprising importing the CA certificate into the data protection system.

12. The method of claim 1, wherein the certificate is not valid in the data protection system if the client certificate does not include the username.

* * * * *